Feb. 8, 1966  W. J. SACKETT, SR  3,233,873
APPARATUS FOR WEIGHING, MIXING AND DELIVERING BULK
FERTILIZER MATERIAL
Filed Sept. 17, 1963  3 Sheets-Sheet 3
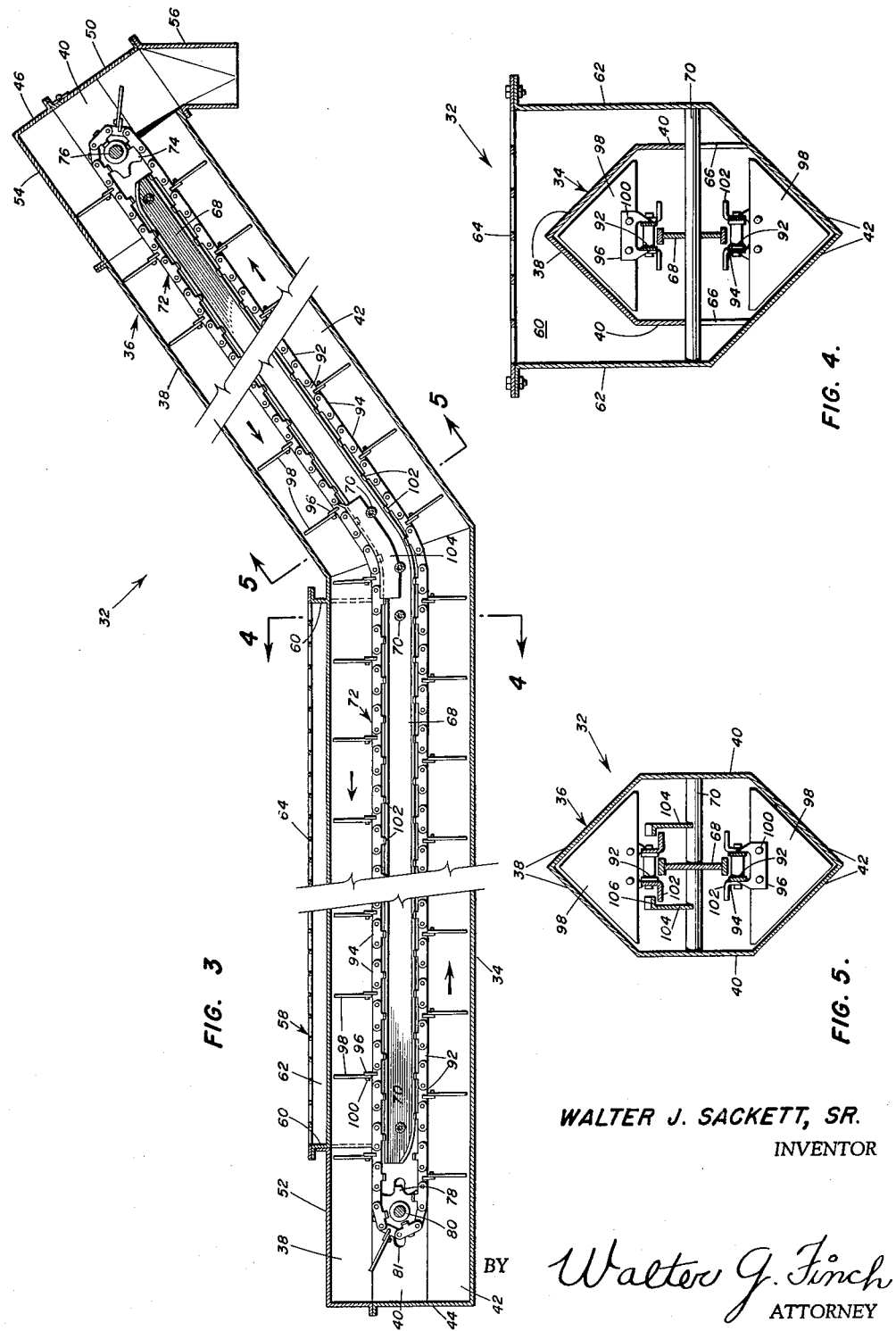
WALTER J. SACKETT, SR.
INVENTOR
BY Walter J. Finch
ATTORNEY

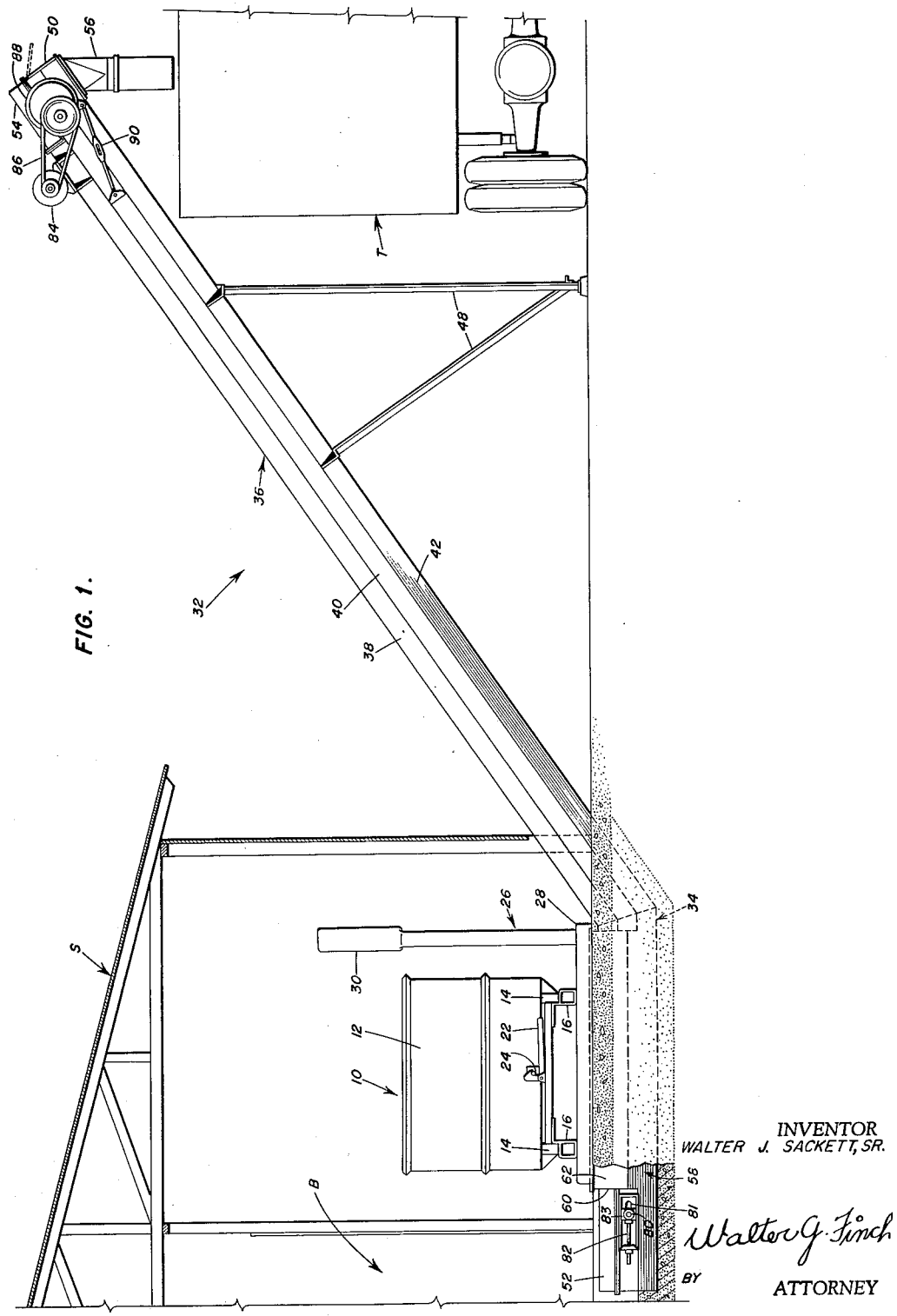

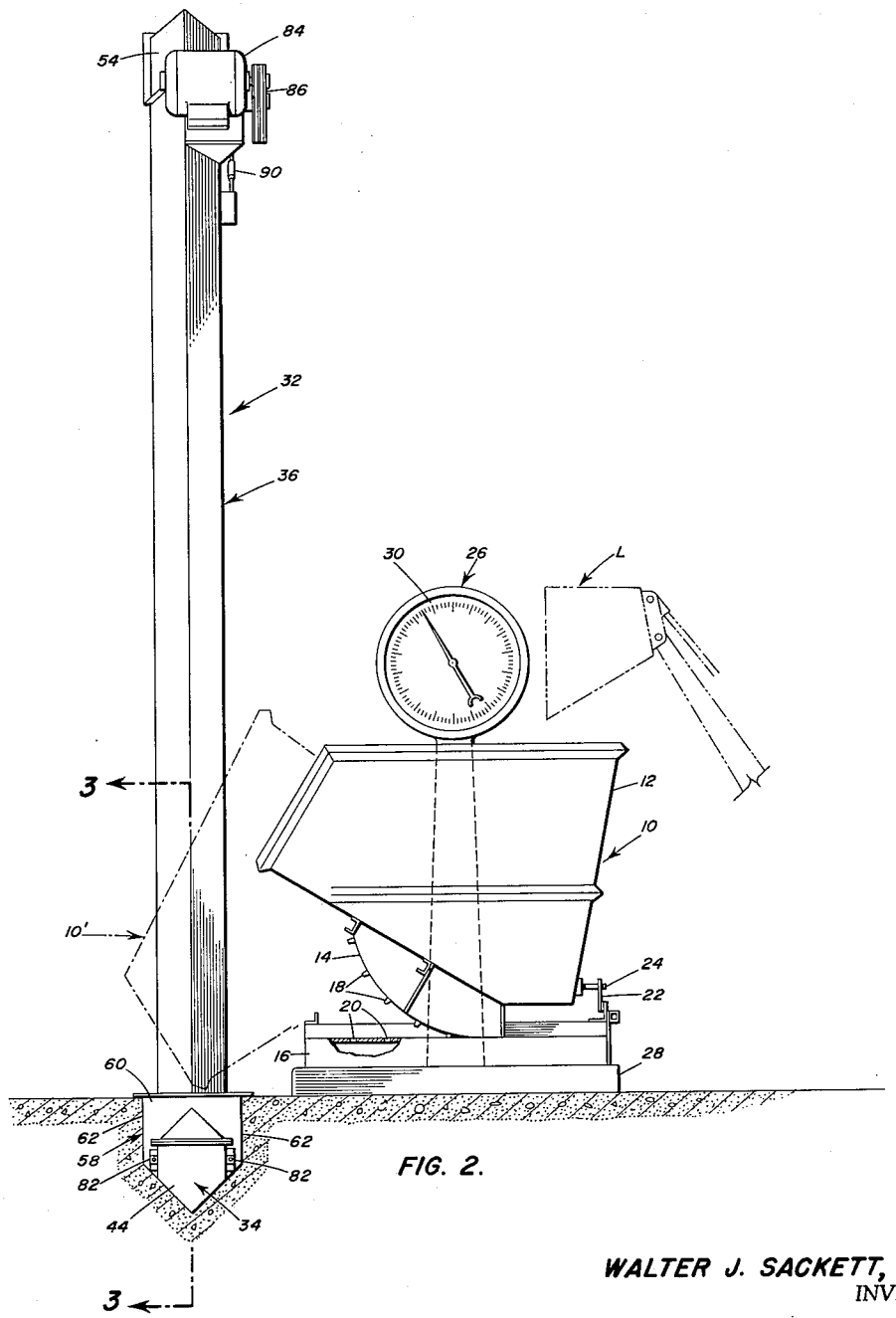

United States Patent Office 3,233,873
Patented Feb. 8, 1966

3,233,873
APPARATUS FOR WEIGHING, MIXING AND DELIVERING BULK FERTILIZER MATERIAL
Walter J. Sackett, Sr., 3700 Echodale Ave., Baltimore, Md.
Filed Sept. 17, 1963, Ser. No. 309,532
8 Claims. (Cl. 259—11)

This invention relates generally to mixing and blending plants, and more particularly it pertains to a conveyor-mixer apparatus for weighing, mixing and delivering bulk granular materials.

Materials such as chemical fertilizer and stock feeds are usually blends of several ingredients. The formulas of these blends vary considerably at the demand of the customer. It is not economical to stock small lots of these blends in mixed form but rather to make them up as they are delivered.

Accordingly, it is an object of this invention to provide a plant arrangement whereby ingredients of a blend of granular material are selected, measured, conveyed, mixed, elevated and discharged to a vehicle of a customer on a short-order basis with a minimum of handling.

Another object of this invention is to provide a material collecting hopper for a conveyor which extends beyond its loading position as it discharges itself into the conveyor and repositions itself when emptied.

Yet another object of the invention is to provide a boot for a material elevator which divides received material into generally equal parts for introduction to both sides of a paddle type conveyor.

Still another object of this invention is to provide a trough type conveyor-elevator housing a material-collecting apex and conveyor blades conforming thereto for efficiently conveying and thoroughly mixing blends.

Another object of this invention is to provide a novel conduit structure in which a load-bearing beam furnishes trackage for the conveyor chain and the enclosure means provides lateral stability to said beam.

Other objects and attendant advantages of this invention will become more readily apparent and understood from the following detailed specification and accompanying drawings in which:

FIG. 1 is a side elevational general arrangement of the apparatus incorporating features of this invention;

FIG. 2 is an end elevation of the apparatus of FIG. 1 on an enlarged scale, as viewed from the left of FIG. 1;

FIG. 3 is a longitudinal section taken through the conveyer apparatus of the invention, taken along line 3—3 of FIG. 2, with certain repetitious elements broken away to permit the use of a further enlarged scale; and FIGS. 4 and 5 are still further enlarged cross-sections taken along lines 4—4 and 5—5, respectively, of FIG. 3.

As best viewed in FIGS. 1 and 2 of the drawings, the present invention comprises, generally, a self-dumping hopper 10, arranged on a platform 28 of a dial reading scale 26 in a sheltering structure S. The hopper 10 delivers accurately measured quantities of fertilizer ingredients to an enclosed elevating conveyor 32, which then mixes the ingredients by tumbling while elevating them to a discharge chute 56 through which they are dumped into a spreader truck T.

The fertilizer ingredients are selected from various bins, one of which is shown at B in FIG. 1, and delivered to the hopper 10 by a power shovel equipped vehicle L. Accurate proportions of the ingredients, by weight, are easily maintained by an observing dial 30 of the dial reading scale 26 as each ingredient is deposited in the hopper 10.

Upon completion of each batch of fertilizer, a latch lever 22, best illustrated in FIG. 2, is manually actuated so as to disengage a pin 24 secured to rear wall 12 of the hopper 10. The weight of the contents of the hopper 10 will then cause the hopper to roll upon its rockers 14, along tracks 16 to the position shown by dash lines at 10' in FIG. 2 thereby dumping its contents into the receiving box 58 of the conveyor 32. The center of gravity of the hopper 10 is so located that, when empty, it will restore itself to the position shown in full lines ready to receive the next batch of fertilizer ingredients. The rockers 14 are provided, along their periphery, with a series of cogs 18 which engage a series of holes 20 in tracks 16—in the fashion of a gear and rack arrangement—thereby maintaining the proper alignment of the hopper 10 along the tracks 16.

The conveyor 32 comprises a comparatively short horizontal section 34, which passes through the receiving box 58, and an elevating section 36 supported by legs 48 as shown in FIG. 1. The adjoining sections 34 and 36 both comprise pairs of upper panels 38, side panels 40, and lower panels 42 welded into a closed conduit of generally hexagonal cross-section, though somewhat compressed in the vertical plane, as best viewed in FIGS. 4 and 5. The conduit thus formed is closed at its ends by walls 44 and 46.

A considerable portion of the horizontal section 34 is encased within the receiving box 58 by its end walls 60 and sidewalls 62. It should be noted, from FIG. 4, that the lower half of that portion of sidewalls 40 which reside within the receiving box 58 is cut away to form a long slot or opening 66 which runs the length of the receiving box 58. A grating 64 is provided, at the top of the receiving box 58, to break up any lumps in the incoming material. The material then slides down over the upper panels 38, between panels 40 and sidewalls 62 and enters through the slots 66, the trough formed by lower panels 42. The material thus entering the trough is carried away by a series of triangular blades 98 which are affixed to an endless chain 72. The sliding down of the material over upper panels 38 and over the lower panels 42 forming the bottom trough of the receiving box represent a splitting and a recombining of the material during discharge from the hopper 10. Since both of these pairs of sliding surfaces, panels 38 and 42, are cone-shaped in cross-section, the splitting and recombining action of the material passing thereover constitutes an effective mixing action.

The chain 72, along with its considerably large number of blades 98, is supported by a substantial I-beam 68 centrally located with the conveyor 32 and running throughout most of its length. The I-beam 68 is fixed to and supported by a plurality of pipes or support bars 70 whose ends are welded to the side panels 40. Within the receiving box 58, the bars 70 are somewhat longer and they are welded to the side panels 40 and the box sidewalls 62.

The chain 72 is driven, at the discharge end of the conveyer 32, by a drive sprocket 74 which is keyed to a shaft 76, and which receives its drive from a motor 84 through a belt drive arrangement 86 and a geared reduction unit 88. The casing of the geared reduction unit 88 is secured against rotation from torque forces by means of an adjustable torque arm assembly 90. At the intake end of the conveyer 32, the chain 72 is carried by an idler sprocket 78 which is secured to an idler shaft 80 whose ends pass through elongated slots 81 in side panels 40 and are carried by journals 83 of slack adjusters 82.

Entrance may be gained at each end of the conveyer 32, for purposes of maintenance or adjustment by means of removable sections 52 and 54. It should be noted that a relief door 50 is provided in the endwall 46 to permit discharge of materials in the event that the discharge chute 56 should become clogged.

The chain 72 comprises a series of inner links 92 alternately connected by outer links 94 each of which is provided with a short finger 102 formed at a right angle to the link 94. As will be noted from an examination of FIG. 3, when that portion of chain 72 lying atop the I-beam 68 is placed under tension, it will tend to straighten and pull away upwardly from the I-beam 68, thereby cause excessive drag and wear to the blades or paddles 98 and the upper panels 38.

This tendency is precluded by means of a pair of chain guides 104, one of which is secured to bars 70, a short distance from each side of the I-beam at the intersection of the horizontal sections 34 and elevating section 36 as can be noted in FIGS. 3 and 5. As indicated in these two FIGS. 3 and 5, the chain 72 atop the I-beam 68 is pulled into close conformity with the I-beam 68 as the fingers 102 pass under and are held down by a flange 106 on each of the guides 104.

The blades 98 are secured by fasteners 100 to brackets 96 which are welded to every other inner link 92, or, when taking all links into account, to every fourth link.

Obviously, many modifications and variations of the present invention are possible in light of the above teachings. It is, therefore, to be understood that within the scope of the appended claims, the invention may be practiced otherwise than as specifically described.

What is claimed is:

1. A conveyor-mixer for granular materials, comprising structure defining an elongated housing consisting of a horizontal section and an inclined section extending longitudinally therefrom, the upper portion of at least said horizontal section consisting of diverging inclined walls forming an inverted trough for splitting the flow of said granular material discharged thereon, the lower portion of each said section consisting of diverging inclined walls forming a trough for recombining the split flow of said granular material, with substantially all of said granular materials received by said lower portion being split by said upper portion, an endless chain positioned within said elongated housing and journalled at opposite ends thereof, a structural member positioned within said elongated housing and forming upper and lower trackways for said endless chain, said endless chain having fingers extending laterally therefrom, said structural member conforming said endless chain to the longitudinal shape of said elongated housing by guide means engaging said fingers at the angle between said horizontal and inclined sections, and blade elements spaced along said endless chain and conforming to the shape of the trough along the lower portion of said elongated housing for conveying said recombined granular material therealong.

2. In combination, a self-dumping hopper for discharging granular materials, and apparatus for conveying and mixing said discharged granular materials, said apparatus consisting of structure defining an elongated housing consisting of a horizontal section and an inclined section extending longitudinally therefrom, the upper portion of at least said horizontal section consisting of walls forming an inverted trough for splitting the flow of granular material discharged from said self-dumping hopper, the lower portion of each said section consistiing of diverging inclined walls forming a trough for recombining the split flow of said granular materials, with substantially all of said granular materials received by said lower portion being split by said upper portion, and endless chain positioned within said elongated housing and journalled at opposite ends thereof, a structural member positioned within said elongated housing and forming upper and lower trackways for said endless chain, said endless chain having fingers extending laterally therefrom, said structural members conforming said endless chain to the longitudinal shape of said elongated housing by guide means engaging said fingers at the angle between said horizontal and inclined sections, and blade elements spaced along said endless chain and conforming to the shape of the trough along the lower portion of said elongated housing for conveying said recombined granular material therealong.

3. The combination of claim 2, wherein said self-dumping hopper is releaseably latched for dumping when the desired amount of granular materials is contained therein.

4. The combination of claim 2, wherein said self-dumping hopper is provided with rockers to shift its discharge end forward during the self-dumping motion.

5. The combination of claim 4, wherein said rockers are provided with spaced cog means, and means are provided for receiving said cog means to thereby guide said self-dumping hopper during said self-dumping motion.

6. Apparatus for conveying granular materials comprising, an elongated housing consisting of a lower trough and an upper trough inverted with respect thereto, each said trough being formed by diverging inclined walls, with one end of said housing having an opening for receiving said granular material and the other end thereof having an opening for discharging said granular material, said housing being divided into two longitudinal sections, with one of said sections being vertically inclined from the other, means including an endless chain arranged within said housing in an upper flight and a lower flight and having blade elements conforming to the shape of said lower trough for conveying said materials from said one end of said housing to said other end thereof, a structural member having its uppermost and lowest surfaces forming trackways for said upper and lower flights, respectively, and arranged longitudinally along said housing, said structural member being correspondingly divided and inclined with respect to said housing, means for making said endless chain conform to the path of said trackways formed by said structural member, consisting of fingers extending laterally from said endless chain and guide elements positioned along said structural element at the angle between the two longitndinal sections of said structural member for engaging said fingers, and support means for spacing said structural member from the sides of said housing.

7. The apparatus as recited in claim 6, wherein said support means consists of longitudinally spaced bars and said guide elements are mounted to said bars adjacent said two longitudinal sections of said structural member.

8. The combination of claim 5, wherein the center of gravity of said self-dumping hopper maintains it in the upright position when empty but shifts to obtain said self-dumping motion when filled with said granular materials, whereby upon said motion said hopper becomes unloaded and automatically returns to said upright position.

References Cited by the Examiner

UNITED STATES PATENTS

| | | | |
|---|---|---|---|
| 688,912 | 12/1901 | Watts | 198—174 X |
| 1,338,514 | 4/1920 | Majervs | 198—174 X |
| 1,552,003 | 1/1925 | Eyerly | 198—53 |
| 2,194,633 | 3/1940 | Bemis | 259—11 |
| 2,297,632 | 9/1942 | Mosley | 198—174 |
| 2,519,970 | 8/1950 | Lang. | |
| 2,571,655 | 10/1951 | Beare | 259—11 |
| 2,679,325 | 5/1954 | Smith | 214—18 |
| 2,800,219 | 7/1957 | Carroll | 198—174 X |
| 2,896,771 | 7/1959 | Mecham | 198—54 |
| 3,009,587 | 11/1961 | Pickrell | 214—15 |
| 3,069,030 | 12/1962 | Schellentrager | 214—18 |
| 3,146,901 | 9/1964 | McDowell et al. | 214—18 |
| 3,167,173 | 1/1965 | Sackett | 198—174 X |

CHARLES A. WILLMUTH, *Primary Examiner.*